United States Patent
Allinquant et al.

[15] 3,653,651
[45] Apr. 4, 1972

[54] SUSPENSION SYSTEMS FOR VEHICLES

[72] Inventors: Fernand Michel Allinquant; Jacques Gabriel Allinquant, both of 53, Avenue Le Notre, 92 Sceaux, France

[22] Filed: Mar. 27, 1970

[21] Appl. No.: 23,186

[30] Foreign Application Priority Data

Mar. 31, 1969 France....................................6909643
Oct. 2, 1969 France....................................6933701

[52] U.S. Cl..................................................267/64 B
[51] Int. Cl. ..........................................F16f 5/00, F16f 9/04
[58] Field of Search...............267/64 R, 64 A, 64 B; 280/124; 188/311, 316

[56] References Cited

UNITED STATES PATENTS

| | | | |
|---|---|---|---|
| 3,157,396 | 11/1964 | Long, Jr. ............................ | 267/64 B |
| 3,046,002 | 7/1962 | Schmitz............................... | 267/64 B |
| 3,104,119 | 9/1963 | Long, Jr. et al. .................... | 267/64 B |
| 3,273,876 | 9/1966 | Hannan............................... | 267/64 A |
| 3,387,856 | 6/1968 | Guilhamat et al..................... | 267/64 A |

Primary Examiner—Drayton E. Hoffman
Attorney—William J. Daniel

[57] ABSTRACT

A suspension device for a vehicle wherein a telescopic damper, having a cylinder and a piston carried by a piston rod emerging through a seal at one end of the cylinder, is laterally surrounded by a deformable enclosure which can be supplied with fluid at an adjustable pressure, whereby at least partly to support the weight of the vehicle, the wall of the deformable enclosure being arranged to isolate the supplied fluid from the seal through which the piston rod emerges from the cylinder.

15 Claims, 11 Drawing Figures

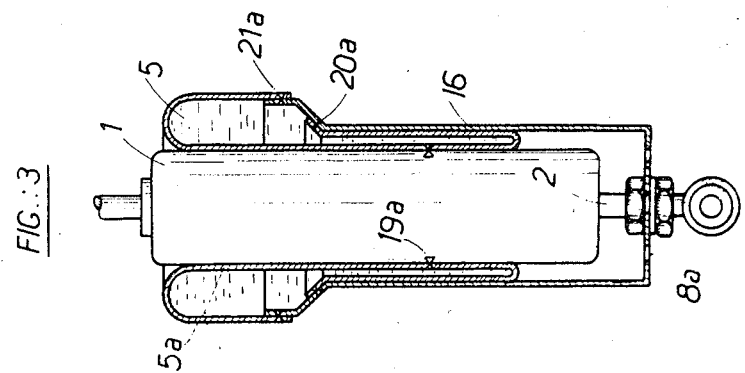
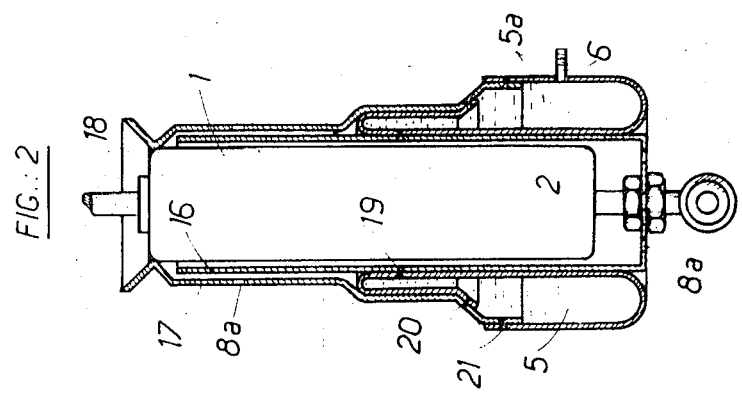
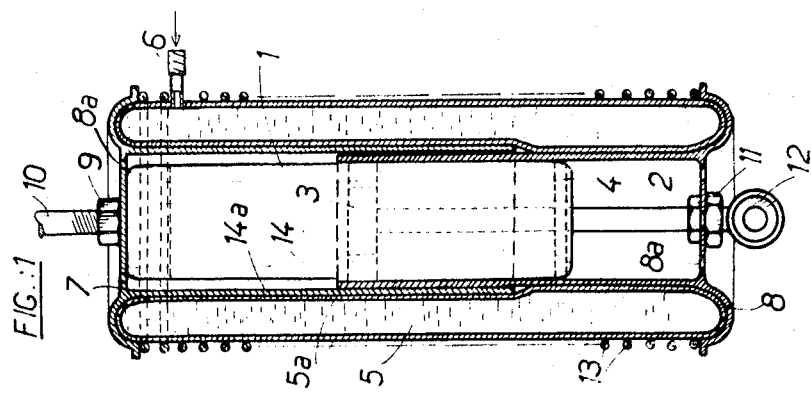

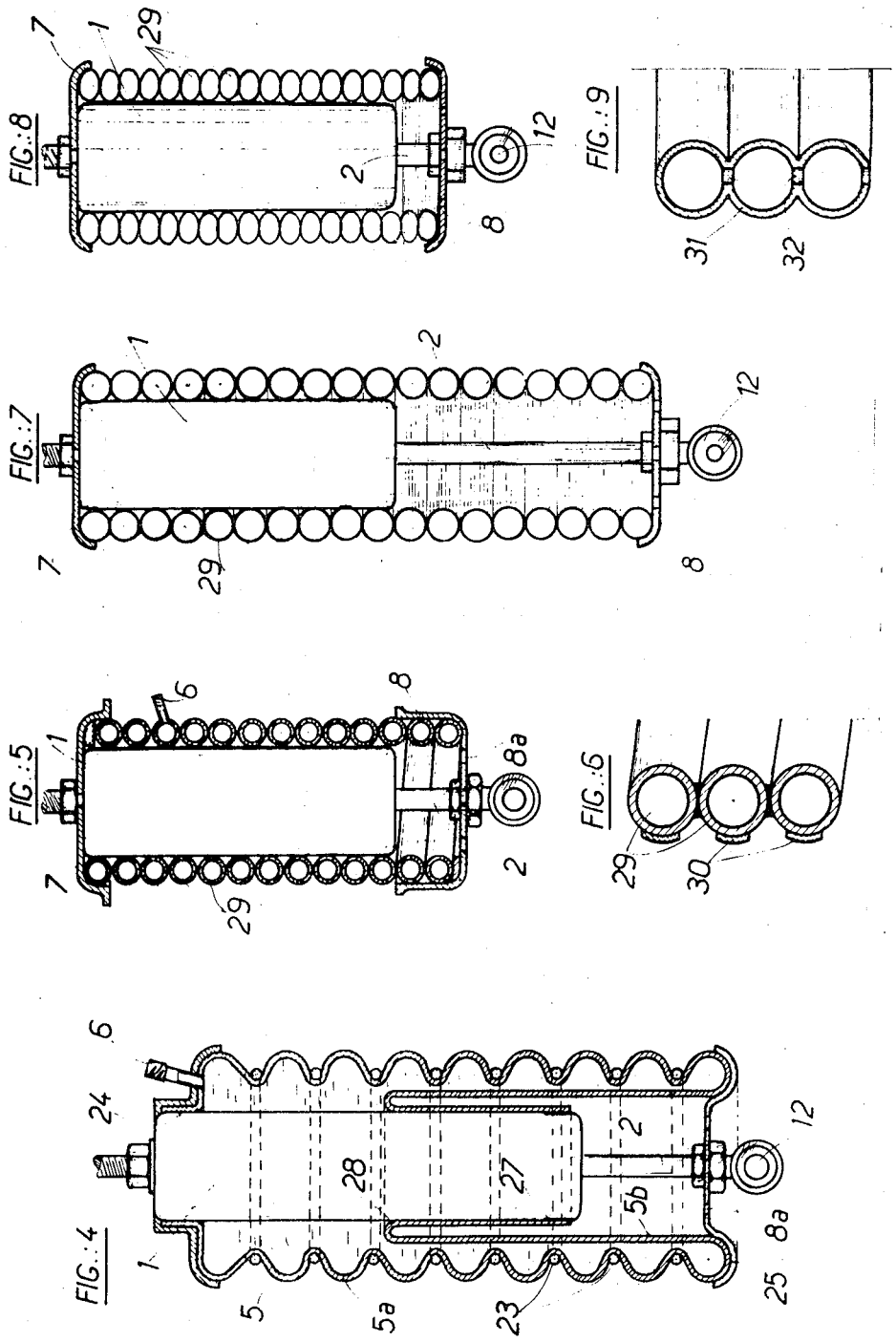

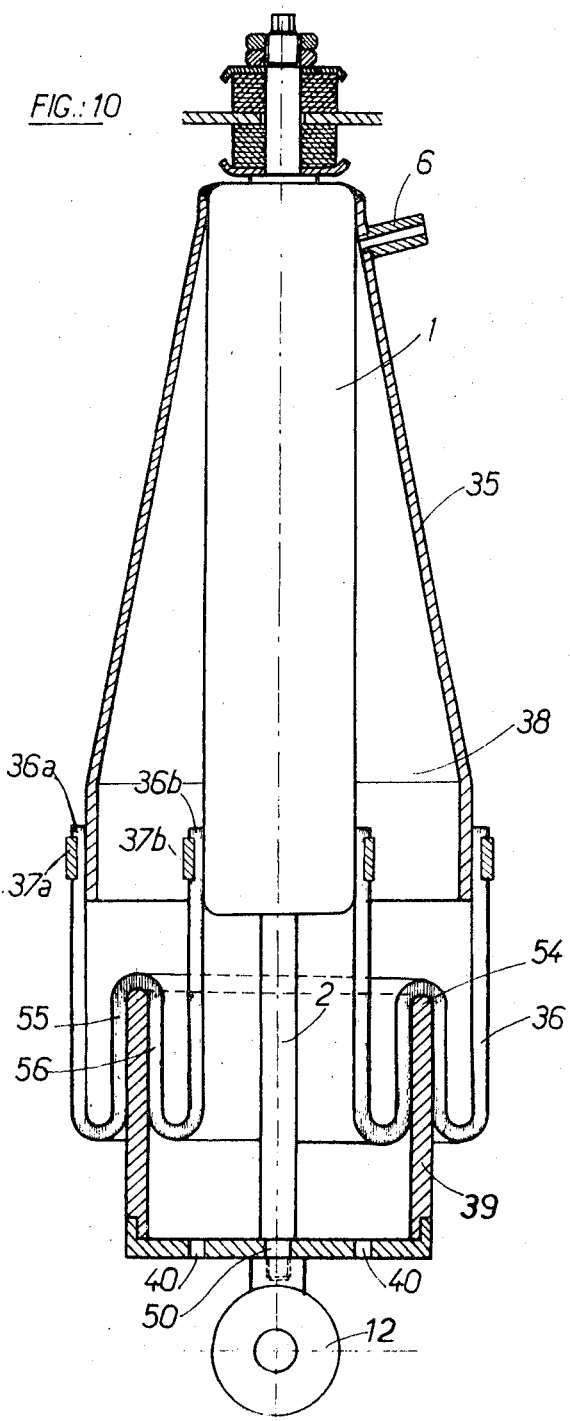
FIG.:10

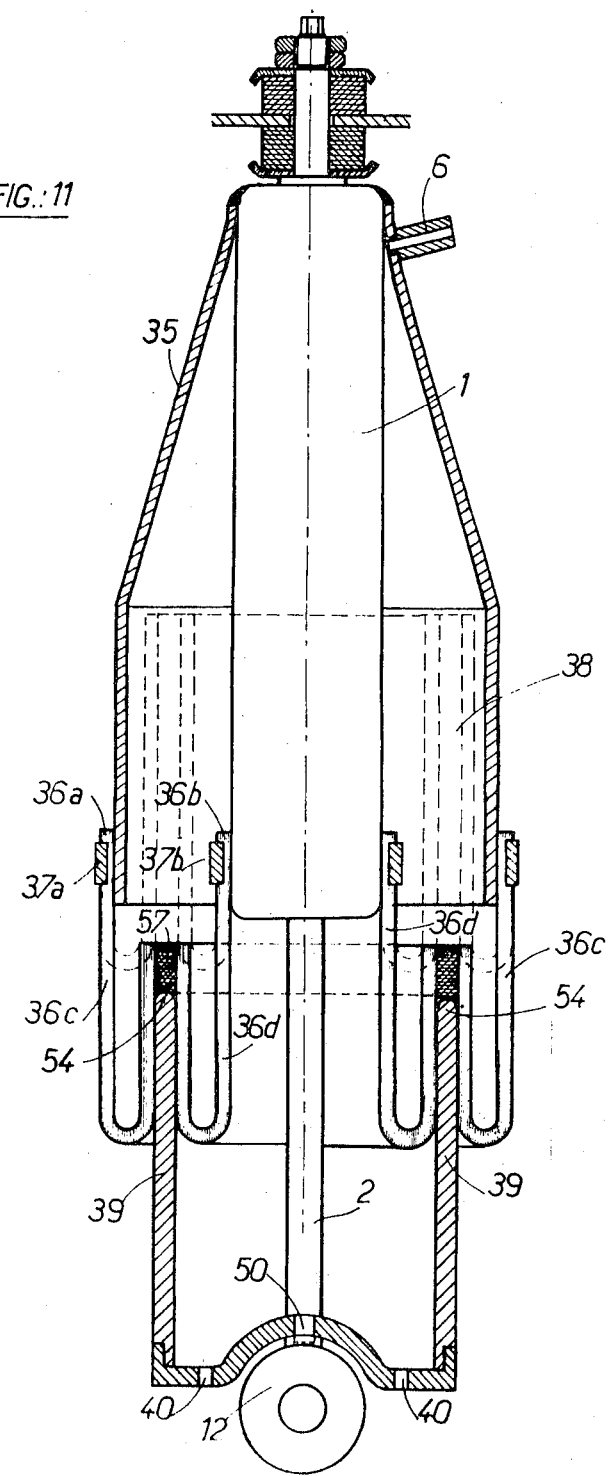
FIG.:11

SUSPENSION SYSTEMS FOR VEHICLES

This invention relates to suspension devices for vehicles, in particular devices of the type in which a telescopic shock-absorbing damper is surrounded by a deformable enclosure into which it is possible to inject a fluid, generally in the gaseous state, at a pressure which is adjustable as a function of the load to be supported, the said fluid producing, by virtue of the deformation of the said enclosure, a force capable of supporting the weight, or a portion of the weight, of the vehicle.

The invention is concerned with improvements in devices of this kind, which can constitute the suspension system of the vehicle per se, or constitute merely a complementary suspension system made to operate, for example, in the event of the normal suspension system becoming overloaded, the latter system being of any type whatever; for example a spring suspension or a torsion bar.

A first improvement, of a general character, consists in that the wall of the deformable and inflatable enclosure is so arranged as to separate from the main volume of the enclosure, and consequently from the fluid located therein, the end of the telescopic damper through which the piston rod emerges and adjacent to which the rod-sealing means is consequently situated.

In already known devices, the gaseous fluid bathes the damper rod and the end of the cylinder containing the seal. We have now established something not apparent hitherto, that irregularities in the working of the damper which were detectable after a certain lapse of time are due to passage of the gaseous fluid into the damper in the vicinity of the seal, whatever may be the precautions taken to ensure the efficiency of the latter. This passage of gas undoubtedly occurs during the violent movements of the suspension in which, through the summation effects, the pressure of the gas associated with the enclosure may instantaneously attain pressures which are very high.

The invention renders it possible to avoid this drawback.

Numerous embodiments may be conceived for the arrangement of the wall of the deformable enclosure and for the composition of the said wall. The latter, made of a material both resilient and gastight, may be combined with a reinforcement or support means so provided as to prevent or reduce its radial deformation while permitting its deformation parallel to the axis of the telescopic damper. The wall of the enclosure may equally well be arranged so as to form what is called a "moving diaphragm" which is combined with one or more sleeves coaxial with the damper.

A particularly advantageous embodiment consists in constituting the wall of the enclosure by a resilient tube formed into a helix with contiguous turns, or arranged in a plurality of superimposed intercommunicating rings, the turns or rings being appropriately reinforced to prevent or reduce radial deformations, so that the tube operates in compression through variations in the form of its cross-section between the circular and the oval form.

The wall of the enclosure may be composed of any resilient, fluid-tight material, such as, for example, mixtures of natural or synthetic rubber, plastic materials like nylon or polyvinyl chloride.

The following description relating to the accompanying drawing, which is given by way of non-limitative preferred example, will indicate how the invention may be carried into practice.

In the drawing:

FIG. 1 is a view in vertical section of a first embodiment of the invention;

FIG. 2 and 3 are diagrammatic views in axial section of two further embodiments of the invention, in which the deformable wall is arranged so as to function as a moving diaphragm;

FIG. 4 is a view of a diagrammatic axial section through a fourth embodiment of the invention which includes a concertina-shaped deformable wall;

FIG. 5 is a view of an axial section through a fifth embodiment in which the deformable wall is one appertaining to a tube made of a resilient material;

FIG. 6 shows on a larger scale a detail of FIG. 5;

FIGS. 7 and 8 show, in two differing operating positions, a modification of the embodiment in FIG. 5 in which the tube of resilient material functions in another and particularly advantageous manner;

FIG. 9 is a detail of a further modification; and

FIGS. 10 and 11 are views of axial sections through two further modifications.

In FIG. 1 is shown the cylinder 1 of a telescopic hydraulic damper with its rod 2. As is well known, the said rod carries a piston 3 which is movable inside the cylinder 1. In the motion of the rod in relation to the cylinder, during the working movements of the suspension system of the vehicle, the said piston forces the oil which fills the cylinder to pass through ducts with which the piston is pierced, thus achieving the required damping effect.

The includes other arrangements which do not need to be described because they are well known and do not form part of the invention.

The rod emerges from the cylinder 1 at one of the ends of the latter, at which location is provided a fluid-tight seal 4, this seal being squeezed against the rod and being intended to prevent leakages of the hydraulic fluid which fills the damper.

In the example illustrated here, the damper is of the type in which the end of the cylinder 1 through which the rod emerges is at the lower portion of the said cylinder, this corresponding to the design of the so-called "mono-tube" damper, but the invention is equally applicable to telescopic dampers in which the emergence of the rod is effected at the upper end of the cylinder, at which location the fluidtight seal will then also be found. These dampers are of the so-called "dual-tube" type, the cylinder consisting of two concentric tubes, of which the inner tube cooperates with the piston while the outer tube forms along with the first-mentioned cylinder an annular space which constitutes a chamber for a reserve of oil and for compensation for the volume of the rod.

All these details are well known to those skilled in the art.

Wishing to have associated with the damper a deformable enclosure 5 capable of being inflated by a gas, for example air at an adjustable pressure through the agency of a nozzle 6 connected to a source of compressed gas, for example to the output of an air compressor, we have had the idea, corresponding to the embodiment illustrated in FIGS. 1 and 2, of constituting the wall of the enclosure 5 of an annular pouch 5a made of a resilient and elastic material, the pouch being entirely closed and being placed around the cylinder 1 of the damper. In this way, the gas introduced into the enclosure 5 cannot have any contact with the seal 4 of the damper. The annular pouch 5a, at its two ends, is fastened, for example by adhesive means, to two restraining cups 7 and 8. One of these cups, that at 7, is rendered rigid with the upper end of the cylinder 1 by means of a nut 9 screwed down on the threaded rod 10, which for its part is rigid with the said cylinder and acts to attach it to the vehicle body. The lower cup 8 is itself fastened by a nut 11 to the piston rod 2, which is provided with the usual eye 12 for the attachment of the axle. Holes 8a drilled in the cup 8 serve to pass air during the working movements of the damper.

When the envelope 5a is not inflated with gas under pressure and when, for example, it contains air at atmospheric pressure, the nozzle 6 being quite open, the pouch operates through the extension and shortening of its elastic wall to follow the elastic movements of the cups 7 and 8.

When a gas, for example compressed air, is introduced through the nozzle 6, the said gas tends to expand the envelope 5a in all directions. The radial expansion of the peripheral portion of the envelope is impeded by hoop means 13. This latter may, for example, be composed of a helicoid of round or flattened wire, or by metal rings adhered to the surface.

The expansion of the inner part of the envelope, opposite the exposed portion (of greater or lesser length) of the rod, is prevented by a sleeve 14 placed around the cylinder 1 between the said cylinder and the envelope and attached to one of the cups, for example the lower cup 8. During the working movements of the damper the said sleeve slides inside a second sleeve 14a, which is of slightly larger diameter and which is rigid with the upper cup 7 and around which the envelope 5a is placed. The combination of the two sleeves 14 and 14a thus forms a telescopic system.

With the envelope 5a thus appropriately restrained radially, the inflating gas is able to expand the envelope only axially, thus exerting a force which tends to thrust the two cups apart, that is to say, to support a portion of the weight of the vehicle body. The magnitude of the force naturally depends on the inflating pressure of the envelope 5a and on the annular surface-area of the said envelope urged against the cups 7, 8. These parameters can be so calculated that devices of this type located at appropriate spots between the vehicle body and the axles constitute, by themselves, the suspension of the vehicle, the envelopes 5a of the said devices then being constantly filled with compressed gas, or, on the other hand, they can be so calculated that the said devices act when the load on the vehicle is large as a complementary system to a suspension system brought into being in another manner. In this case, the compressed gas is only introduced when a certain load is exceeded, it being possible to raise the pressure as the load is increased.

In the modification shown in FIG. 2, the deformable wall 5a of the gas-filled enclosure 5 is arranged between two rigid sleeves 16, 17. One of these, 16, of cylindrical formation, is arranged with a certain degree of play around the cylinder 1 of the damper, and is made rigid with the rod 2. The other sleeve 17, which widens towards its lower end, is welded at 18 to the upper end of the cylinder 1 of the damper. The deformable wall 5a, which in the example shown here does not on its own constitute a continuous pouch, as was the case in FIG. 1, but possesses two ends, 20 and 21, is adhered in a fluid-tight manner, over a small area close to these ends, to the outer sleeve 17. Along with the said sleeve it thus forms the fluid-tight annular enclosure 5, the gas which fills it, and which is introduced through the nozzle 6, being unable to make any contact with the fluid-tight seal around the rod 2. Apart from this, the deformable wall 5a is attached, for example, by adhesive means, to the sleeve 16 over an annular area 19 of modest height.

Given that FIG. 2 shows the position occupied by the members when the damper is contracted to its maximum extent, it will be understood that, during extension movements of the damper, when the sleeve 17, which is rigid with cylinder 1, shifts upwardly in relation to the sleeve 16, which is rigid with the rod 2, the upper free projecting loop of the wall 5a which exists between the areas of attachment 19 and 20 extends as it allows the movement to take place. The latter occurs practically without any sliding effect and without rubbing by the material of the envelope 5a against the surfaces of the sleeves 16 and 17, which is of considerable advantage.

Naturally, the arrangement should be such that between the areas of attachment 19 and 20 there exists a sufficient length of envelope, due allowance being made for the maximum working movement of the damper.

In this example, the radial expansion of the wall 5a is prevented towards the inside by the said wall resting against the sleeve 16, and towards the outside by a suitable reinforcement around the wall 5a. This reinforcement may be of metal or of textile material (the wall 5a is made of fabriccovered rubber so as to be merely resilient and flexible, but not extensible).

The surface over which the gas pressure is exerted to provide the supporting force is the annular surface s corresponding to the projecting portion of the sleeve 17.

Naturally holes such as those at 8a are provided in the sleeves at appropriate locations, so as to allow the passage of air.

This embodiment not only has the advantage mentioned hereinbefore of preventing or of reducing any rubbing of the deformable wall against solid surfaces, but also has the advantage of lending itself to the positioning of the assembly on certain vehicles in which the dampers have to be accommodated inside a bell-shaped casing widening towards the bottom.

The embodiment shown in FIG. 3 differs from the preceding one through the reversal of the arrangement of the moving resilient wall, this making it possible to eliminate one of the sleeves.

The resilient wall is fixed directly to a small area 19a on the cylinder 1 of the damper which it surrounds, and its two ends are fixed at 20a and 21a to the sleeve 16 which is rigid with the damper rod.

In the embodiment shown in FIG. 4, the wall of the damper cylinder 1 in some measure forms the boundary of the gas-filled chamber 5, this arrangement having no drawbacks, it being easy to protect this part by the application of paint to combat corrosion arising through impurities which may be present in the gas used for inflation.

The deformable envelope 5a, preferably so covered with textile material as to be inextensible while still being resilient, is of concertina pattern, being provided in its pleats with steel rings or non-stretching wires 23. At its upper end, the said wall is fixed at 24 to the upper end of the damper cylinder, while at its lower end it is attached to a cup 25 attached to the rod 2 of the damper. The gas-filled chamber 5, of annular formation, is closed on the side of the rod-sealing means by the resilient wall 5b which extends the wall 5a inwardly and is attached at 27, for example, by adhesive means, to the lower end of cylinder 1, forming a free projecting loop which operates like a movable wall during the working movements of the damper.

In order to prevent centrifugal radial expansion of the portion 5b of the wall, it is possible to provide an arrangement of telescopic sleeves similar to that described in respect of FIG. 1. The projecting loop 28 will then be on the outside of the sleeve with the greater diameter, the areas of attachment 24 and 27 being arranged on this sleeve, the wall of which will close off the chamber 5.

In order to provide the characteristics of the rubberized wall 5a, it is important to make it operate in compression rather than in extension, for example by arranging to inflate the enclosure outside the car and thus to set it at a predetermined figure in respect of volume, the positioning and loading on the vehicle determining the compression and contraction applying to the enclosure.

In the embodiment illustrated in FIGS. 5 and 6, the deformable chamber for compressed gas is composed of a tube 29 made of a resilient material and wound in contiguous turn around the damper between two cups 7 and 8 which are similar to those described in respect of FIG. 1 and are rigid with the damper cylinder 1 and with rod 2 respectively. This tube acts like a spring the strength of which is a function of the pressure of the gas introduced through the nozzle 6 mounted on one of the turns. The latter, while contiguous, may be separate, then merely finding support one on another, or they may in a further instance be joined or welded together either after manufacture or by a moulding process. It is this latter case which is shown in FIG. 6.

It is possible to conceive various embodiments and various modes of operation for such a system. For example, the turns of the tube need only be equipped with extensible material on the outside, around their equators, this being effected by means of a metal strip or textile strip 30 which prevents radial expansion. In this case, any increase in the gas pressure tends to bring about expansion of the turns parallelly to the axis of the damper, the load-supporting force being increased.

In the modification shown in FIGS. 7 and 8, which is a particularly important one, the turns are completely covered in fabric, so that they are inextensible. In this case, the form of the cross-section of the turns corresponding to the maximum extension of the damper is the circular form (FIG. 7), while the turns assume the shape of an oval flattened vertically (FIG. 8) when the damper is contracted.

During the heaving movements of the suspension, the cross-section thus varies from a circle to an oval flattened vertically.

In these two embodiments, it is possible to provide an arrangement of telescopic sleeves similar to that described in relation to FIG. 1, so as to hold in place the turns located opposite the exposed portion of the rod 2.

By way of modification (see FIG. 9), instead of helicoidal turns it is possible to provide rings 31 superimposed one on another and adhered together, these communicating with each other by holes such as those at 32.

These embodiments possess the advantage that the stiffness of the pneumatic suspension which is obtained may be graduated by a suitable selection of the diameter of the tube, stiffness increasing for a given inflation pressure when the diameter of the tube is reduced.

Numerous modifications may be conceived without thereby going beyond the scope of the invention as defined in the appended claims.

In the embodiments shown in FIGS. 1, 5, 6 and 8 to 9 the deformable enclosure may be composed of a soft material having open cells and contained in a fluid-tight integument.

In FIG. 10, the cylinder of the telescopic hydraulic damper is seen at 1 and the piston rod at 2.

At the top of the cylinder 1 there is attached, for example, by welding, a metal wall 35 in the general form of a frustrum of a cone, this frustrum widening towards the bottom. A wall 36, with a cylindrical or conical initial form and made of an extensible, fluid-tight resilient material such as, for example, natural or synthetic rubber, a fabric backed with rubberized mixtures or a plastic material, has its terminal margins 36a, 36b attached respectively to the free end of the frustrum of a cone 35 and to the damper cylinder 1. The attachment is carried out in a fluid-tight manner, for example by means of clamping strips 37a, 37b, or, further, by arranging adhesion to the metal walls, or by the combining of these two methods. The deformable wall 36 thus forms a kind of fluid-tight annular pouch which, along with the frustrum of a cone 35, defines an enclosure 38 which is closed and completely separate from the end of the cylinder 1 through which the piston rod 2 emerges.

As hereinbefore, a nozzle 6 makes it possible to introduce into the said enclosure 38 a gas subject to a pressure which has been selected appropriately.

The resilient enclosure 36 should be able to undergo deformation regularly so as to follow the movements of the rod 2 and of the piston which it carries. With this aim in view, a cylindrical cover 39, in the shape of an upturned bell and pierced with holes 40 for the free circulation of air around the rod, is attached at 50, at the lower end of the rod.

The bell or cover 39 has a rounded free edge 54 by means of which it rests against the resilient envelope 36, which folds over on either side of the said edge, resting on the outer and inner faces of the cover. During the movements of the latter, the folds 55, 56 of the resilient wall thus come to roll down on the cover 39 or to detach themselves therefrom.

Naturally the length of the resilient wall 36 as measured between the attachment areas 37a of and of 37b, as well as the generating dimension appertaining to the cover 39, should be appropriately selected, due allowance being made for the stroke of the rod and the piston, so that the said resilient wall will not tend to be pounded by the cover 39 when the damper is completely contracted.

The arrangement may be still further improved in accordance with FIG. 11 so as to avoid rubbing and wear in the portion of the resilient wall which comes to bend down, in accordance with FIG. 1, over the free edge 54 of the cover 39.

The resilient wall is no longer continuous, but is formed of two half-walls 36c, 36d. At one of their ends, each of the said half-walls 36c, 36d is attached in a fluid-tight manner, as indicated hereinbefore, on the frustrum of a cone 35 and on the damper cylinder 1 respectively. Above the edge 54 of the cover 39, the half-walls are attached in a fluid-tight manner, for example by adhesive means or by a hot vulcanization process, to a ring 57 made of a hard material, for example ebonite or a hard plastic material or, further, a metal, which ring surmounts the edge 54 of the cover.

In this case, the length of the half-walls 36c, 36d should be specially determined, not only in order to avoid excessive tensile stress in the said half-walls when the damper is completely contracted, but also so that a portion of the said half-walls should remain applied against the inner face and outer face respectively of the cover when the damper is in its completely extended position.

FIG. 11 shows in unbroken lines the position of the members which corresponds approximately to the complete extension of the damper, and chain-dotted lines indicate the position assumed by the half-walls 36c, 36d when the damper is contracted.

In operation, the form of the resilient walls may diverge more or less greatly from the theoretical form which has been illustrated in the drawing.

Naturally, as has been stated, the scope of the invention would not be exceeded if the mono-tube damper were replaced by a dual-tube damper. In the latter case, the arrangements shown in the figures would be reversed, since the dual-tube damper has its fluid-tight seal in the upper part of the cylinder.

For effecting inflation under pressure, it is admissible to proceed in any appropriate manner and, for example, to carry out inflation or to adjust the pressure by means of units of equipment installed in a service station or, further, to provide on board the vehicle itself a source of compressed air associated with any appropriate valves and preferably with a trim corrector which will render it possible to coordinate the inflation of the devices associated with the various wheels of the vehicle. It would be possible to use to good advantage the compressor device described in U.S. Pat. No. 3,183,015.

We claim:

1. In a shock absorber and suspension strut device comprising a telescopic shock absorber including a piston and cylinder assembly with a piston rod emerging through a seal from an end of the cylinder; a deformable enclosure surrounding the shock absorber and having a first wall portion connected to the cylinder for movement therewith and a second wall portion connected to the piston for movement therewith; and means to supply the enclosure with fluid under pressure; the improvement comprising a further wall portion defining an inner space isolated from said enclosure, said inner space surrounding the piston seal and at least a portion of the piston rod adjacent thereto whereby said piston seal is not exposed to said pressurized fluid.

2. A device according to claim 1, including reinforcement means for minimizing lateral expansion of the wall of the deformable enclosure.

3. A device according to claim 1, including a rigid wall associated with the deformable enclosure to minimize centrifugal deformation adjacent the portion of the piston rod emerging from the cylinder.

4. A device according to claim 3, characterized in that the said rigid supporting wall comprises a sleeve fastened to the damper.

5. A device according to claim 4, including telescopic sleeves the parts of which are fastened to the damper cylinder and to the rod respectively.

6. A device according to claim 1, wherein the deformable enclosure at least partly forms a closed annular pouch isolated from the piston rod.

7. A device according to claim 1, wherein the deformable enclosure comprises a free projecting loop, the device including two coaxial sleeves respectively connected with the damper cylinder and the damper piston and between which the said projecting loop is located.

8. A device according to claim 1, wherein the deformable enclosure, made of a resilient but inextensible material, is folded in a concertina manner, the pleats being reinforced with rings.

9. A device according to claim 1, wherein the deformable enclosure comprises tubular parts made of a resilient material, the said parts being either contiguous turns of one or more tubes coiled in a helix, or super-imposed rings.

10. A device according to claim 9, characterized in that the tubular parts in the form of turns or rings are made of extensible material, are reinforced around their equators so as not to undergo deformation except parallel to the axis of the damper.

11. A device according to claim 9, characterized in that the parts of the tubes are reinforced or fabric-covered so as to be inextensible, so that the said parts operate by altering from a circular cross-section for the maximum extension of the damper to a cross-section in the form of an oval flattened vertically when the damper is contracted.

12. A device according to claim 9, wherein the tubular parts are welded together.

13. A device according to claim 1, including a rigid enclosure connected to the damper cylinder, means connecting the deformable enclosure to the said rigid enclosure, and a bell-shaped cover connecting the deformable enclosure to the damper rod, whereby the deformable enclosure acts during working movements of the damper as a moving diaphragm.

14. A device according to claim 13, characterized in that a portion of the deformable enclosure rolls downwardly over the free edge of the cover and comes to rest, at least for an intermediate position of the rod, on the outer face and on the inner face of the cover.

15. A device according to claim 13, wherein the deformable enclosure is formed of two half-walls which are joined in a fluid-tight manner to a ring made of hard material resting on the free edge of the cover.

* * * * *